(12) United States Patent
Xiong et al.

(10) Patent No.: US 12,153,119 B2
(45) Date of Patent: Nov. 26, 2024

(54) SYSTEM AND METHOD TO DETECT PRESENCE USING LOW-COST RADAR

(71) Applicant: Carrier Corporation, Palm Beach Gardens, FL (US)

(72) Inventors: Ziyou Xiong, Wethersfield, CT (US); Rajeev Dubey, Highland Beach, FL (US); Mateusz Mazur, Sopot (PL); Michael Ramoutar, Westford, MA (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 169 days.

(21) Appl. No.: 17/455,084

(22) Filed: Nov. 16, 2021

(65) Prior Publication Data

US 2022/0163654 A1 May 26, 2022

Related U.S. Application Data

(60) Provisional application No. 63/198,892, filed on Nov. 20, 2020.

(51) Int. Cl.
*G01S 13/56* (2006.01)
*G01S 7/41* (2006.01)
*G01S 13/536* (2006.01)

(52) U.S. Cl.
CPC .............. *G01S 13/56* (2013.01); *G01S 7/415* (2013.01); *G01S 13/536* (2013.01)

(58) Field of Classification Search
CPC .......... G01S 13/56; G01S 13/536; G01S 7/41; G01S 7/415; G01S 13/04; G01S 7/412

USPC ........................................................... 342/28
See application file for complete search history.

(56) References Cited

U.S. PATENT DOCUMENTS

| 9,753,131 | B2 | 9/2017 | Adib | |
|---|---|---|---|---|
| 10,746,852 | B2 | 8/2020 | Adib | |
| 2003/0201894 | A1* | 10/2003 | Li | B60N 2/002 340/457 |
| 2019/0094350 | A1* | 3/2019 | Baheti | G01S 7/415 |
| 2019/0346550 | A1* | 11/2019 | Finn | A61B 5/0507 |

FOREIGN PATENT DOCUMENTS

| EP | 3739356 A1 * | 11/2020 | .............. G01P 15/18 |
|---|---|---|---|
| WO | 2020101759 A2 | 5/2020 | |

* cited by examiner

*Primary Examiner* — Bernarr E Gregory
*Assistant Examiner* — Remash R Guyah
(74) *Attorney, Agent, or Firm* — Souad Hakim

(57) ABSTRACT

The present disclosure relates to detecting presence using a low-cost radar. A transmitted signal including repetitions of a transmitted signal is emitted from a transmitting antenna. A received signal including a combination of a plurality of reflections of the transmitted signal is received at receiving antennas. For each received signal, the received signal is processed to determine whether a threshold has been exceeded. When the received signal exceeds the threshold, presence due to a motion from a moving body is determined. When the received signal does not exceed the threshold, a periodicity of the received signal is measured to determine whether the periodicity of the received signal is within a vital range, and presence due to a vital sign is determined when the periodicity is within the vital range.

20 Claims, 5 Drawing Sheets

SYSTEM AND METHOD TO DETECT PRESENCE USING LOW-COST RADAR

CROSS REFERENCE TO A RELATED APPLICATION

The application claims the benefit of U.S. Provisional Application No. 63/198,892 filed Nov. 20, 2020, the contents of which are hereby incorporated in their entirety.

BACKGROUND

This invention relates to presence detection. More particularly, the invention relates to the use of low-cost frequency modulated continuous wave (FMCW) radar to detect the presence of people in a monitored space.

Frequency modulated continuous wave (FMCW) radar is a type of radar that is capable of changing its operating frequency during measurement (i.e., the transmission signal can be modulated in frequency or in phase). This frequency modulating provides FMCW with a timing reference that allows FMCW to accurately measure the distance between the radar and surrounding objects (which may be stationary in certain instances). One key feature of FMCW radar is ability to separate reflections from different objects into different buckets based on their reflection times. This enables FMCW to differentiate between objects. Due to this ability, FMCW radar has been used in the past for localization determination (i.e., identifying where an individual is in a monitored space). This localization determination is traditionally completed by sensing the amount of power arriving from different distances to localize the individuals. In addition to localization determination, FMCW radar has been used to detect vital signs of individuals in a monitored space.

When detecting vitals, the FMCW technique is used as a filter (i.e., to isolate the reflected signal arriving from different distances in the monitored space into different buckets before these signals are analyzed to extract vital signs). This analyzing involves the elimination of reflections off of static objects like walls, furniture, etc., which, since they don't typically move, their reflections don't typically change over time, and therefore can be removed (e.g., by subtracting out consecutive measurements). In addition, to accurately detect the vital signs, aperiodic movements (e.g., caused by movement of large limbs such as arms, legs, etc.) are commonly discarded (i.e., not further considered/processed). Once the static objects and aperiodic movement are removed/discarded, the vital signs are detected by measuring the periodicity of the signal (e.g., by completing a fast Fourier transform (FFT) on the received signal).

The previous methods of detecting vital signs using FMCW rely on the use of a threshold. For example, previously, unless the periodicity was above a certain threshold then the reflections were discarded. In the past this threshold was set between a static period and a quasi-static period. It should be appreciated that measurements (i.e., reflections) may be categorized as originating either from a static period (e.g., where the monitored space is empty of individuals), an active period (e.g., where an individual is actively moving, such as walking, in the monitored space), or a quasi-static period (e.g., where the individual is present in the monitored space but is stationary, such as sitting and breathing). The difference between the reflections from the static period and the reflections from the quasi-static period can be very minimal. As such, the establishment of a reliable threshold between these periods can be difficult to achieve. If not established correctly, the threshold may cause missed detections to occur. For example, if the threshold is set too high then a sitting person (i.e., quasi-static) would not be detected.

It should be appreciated that neither of the above-described uses of FMCW radar are ideal for determining presence (i.e., whether there is or isn't someone in the monitored space). For example, the localization determination methodology will cause missed presence detection due to the inability to detect individuals in a quasi-static state, and the vital sign methodology will cause missed presence detection due to the reliance on a difficult to establish threshold.

Accordingly, there remains a need for a system and method that can reliably detect presence using low-cost frequency modulated continuous wave (FMCW) radar.

BRIEF DESCRIPTION

According to one embodiment, a method for detecting presence using a low-cost radar is provided. The method includes a step for emitting a transmitted signal comprising repetitions of a transmitted signal pattern from a transmitting antenna. The method includes a step for receiving, at one or more receiving antennas, a received signal comprising a combination of a plurality of reflections of the transmitted signal. The method includes, for each received signal, a step for processing the received signal to determine whether a threshold has been exceeded. When the received signal exceeds the threshold, the method determines presence due to a motion from a moving body. When the received signal does not exceed the threshold, the method includes a step for measuring a periodicity of the received signal to determine whether the periodicity of the received signal is within a vital range. When the periodicity of the received signal is within the vital range the method determines presence due to a vital sign.

In accordance with additional or alternative embodiments, the threshold represents a variation over a time period of the reflections of the transmitted signal in the received signal.

In accordance with additional or alternative embodiments, the time period includes a static period, an active period, and a quasi-static period.

In accordance with additional or alternative embodiments, the threshold is established between the static period and the active period.

In accordance with additional or alternative embodiments, the threshold is greater than a difference between the reflections during the static period and the quasi-static period.

In accordance with additional or alternative embodiments, the measuring of the periodicity of the received signal is completed during the quasi-static period.

In accordance with additional or alternative embodiments, the periodicity is measured by determining a frequency of a plurality of spectral peaks.

In accordance with additional or alternative embodiments, the vital range is within a range of respiratory rates.

In accordance with additional or alternative embodiments, the vital range is within a range of heartbeat rates.

In accordance with additional or alternative embodiments, the low-cost radar is a frequency-modulated continuous wave (FMCW) type radar.

According to another aspect of the disclosure, a presence detection system utilizing a low-cost radar is provided. The presence detection system includes one or more transmitting antenna and one or more receiving antenna. The presence detection system includes a transmitter coupled to the transmitting antenna. The transmitter configured to generate a transmitting signal comprising repetitions of a transmitting signal pattern. The presence detection system includes a processor coupled to the transmitting antenna and the receiving antenna. The processor configured to cause the system to (i) emit the transmitted signal comprising repetitions of a transmitted signal pattern from the transmitting antenna; (ii) receive, at one or more receiving antennas, a received signal comprising a combination of a plurality of reflections of the transmitted signal; and for each received signal: (iii) process the received signal to determine whether a threshold has been exceeded. When the received signal exceeds the threshold, the presence detection system determines presence due to a motion from a moving body. When the received signal does not exceed the threshold, the presence detection system measures a periodicity of the received signal to determine whether the periodicity of the received signal is within a vital range. The presence detection system determines presence due to a vital sign when the periodicity of the received signal is within the vital range.

In accordance with additional or alternative embodiments, the threshold represents a variation over a time period of the reflections of the transmitted signal in the received signal.

In accordance with additional or alternative embodiments, the time period includes a static period, an active period, and a quasi-static period.

In accordance with additional or alternative embodiments, the threshold is established between the static period and the active period.

In accordance with additional or alternative embodiments, the threshold is greater than a difference between the reflections during the static period and the quasi-static period.

In accordance with additional or alternative embodiments, the measuring of the periodicity of the received signal is completed during the quasi-static period.

In accordance with additional or alternative embodiments, the periodicity is measured by determining a frequency of a plurality of spectral peaks.

In accordance with additional or alternative embodiments, the vital range is within a range of respiratory rates.

In accordance with additional or alternative embodiments, the vital range is within a range of heartbeat rates.

In accordance with additional or alternative embodiments, the low-cost radar is a frequency-modulated continuous wave (FMCW) type radar.

BRIEF DESCRIPTION OF THE DRAWINGS

The subject matter, which is regarded as the disclosure, is particularly pointed out and distinctly claimed in the claims at the conclusion of the specification. The following descriptions of the drawings should not be considered limiting in any way. With reference to the accompanying drawings, like elements are numbered alike:

DETAILED DESCRIPTION

A presence detection system and a method for detecting presence using a low-cost radar are provided. The system and method make it possible to accurately detect presence of one or more individuals within a monitored space. It should be appreciated that the detection of presence of one or more individuals within a monitored space may be binary in nature (e.g., either someone is present in the monitored space or the space is empty). As will be described below, the presence detection system and method described herein make it possible to detect presence in both quasi-static periods and active periods in a reliable manner (i.e., more reliably than existing methodologies that use FMCW radar for localization determination and vital sign detection). For example, the methodology used for localization determination may be unable to detect presence during the quasi-static period due to the inability to detect vital signs, and the vital sign detection methodology may be unable to reliably detect presence during quasi-static periods by being reliant on a difficult to establish threshold. It should be appreciated that the presence detection system and method described herein utilize a threshold only for determination of presence during an active period (i.e., not during the quasi-static period, as is done by the existing vital sign detection methodology). As will be described in further detail below, the threshold used to detect presence during the active period for the presence detection system and method described herein is set between the active period and the static period (e.g., which may mean that the threshold may not be between the static period and the quasi-static period, as is done by the existing vital sign detection methodology).

Figure 1:
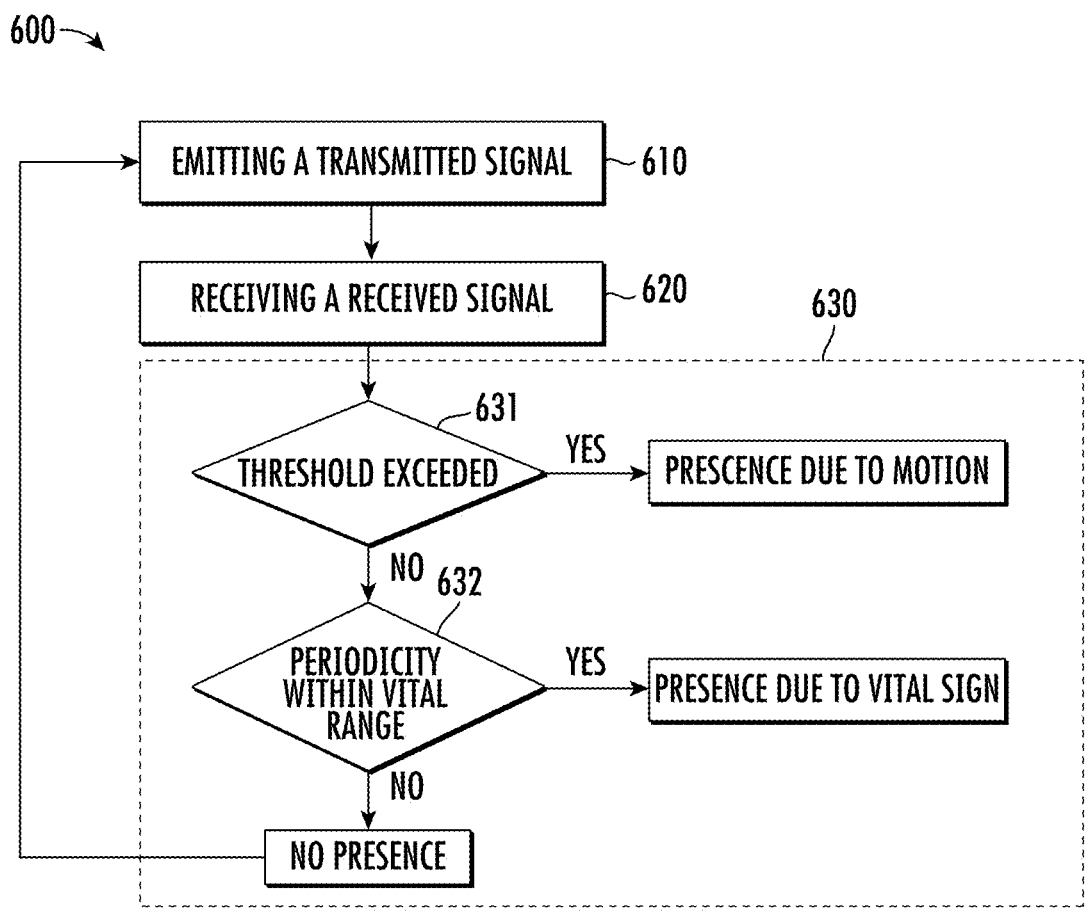
FIG. 1 is a flow diagram illustrating a method for detecting presence using a low-cost radar in accordance with one aspect of the disclosure.

With reference now to the Figures, a flow diagram illustrating a method 600 for detecting presence using a low-cost radar (e.g., frequency modulated continuous wave (FMCW) type radar) is shown in FIG. 1. As shown in FIG. 1, the method 600 includes step 610 for emitting a transmitted signal including repetitions of a transmitted signal pattern from a transmitting antenna 211 (shown in FIG. 5). As shown in FIG. 1, the method 600 includes step 620 for receiving, at one or more receiving antennas 211 (shown in FIG. 5), a received signal including a combination of a plurality of reflections of the transmitted signal. For example, the transmitted signal may reflect off one or more static objects and/or individuals (which may be stationary or moving) within a monitored space and be received by the receiving antenna(s) 211. As shown in FIG. 1, each received signal may be processed (step 630) to determine whether a threshold has been exceeded. If the received signal exceeds the threshold (step 631) then presence may be determined due to a motion from a moving body (e.g., an individual). If the received signal does not exceed the threshold (step 632) then a periodicity of the received signal is measured to determine whether the periodicity of the received signal is within a vital range. If the periodicity of the received signal is within the vital range then presence due to a vital sign is determined. If the periodicity of the received signal is not within the vital range then the no presence is determined.

Figure 5:
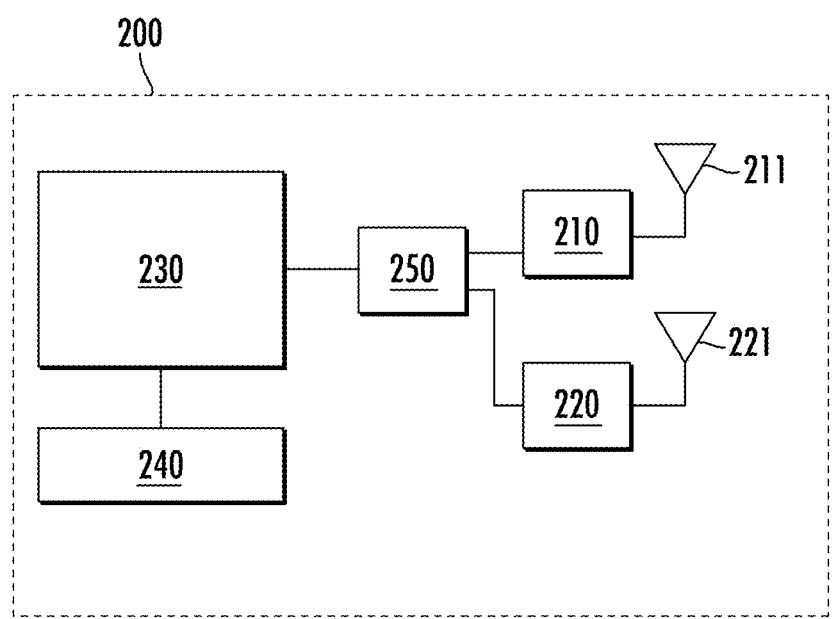
FIG. 5 is a schematic illustration of an exemplary presence detection system utilizing a low-cost radar in accordance with one aspect of the disclosure.

This method 600 may be completed using the exemplary presence detection system 200 shown in FIG. 5 in certain instances. As shown in FIG. 5, the presence detection system 200 includes one or more transmitting antenna 211 and one or more receiving antenna 221. A transmitter 210 is coupled to the transmitting antenna 211. The transmitter 210 is configured to generate a transmitting signal including repetitions of a transmitting signal pattern. As shown, the system 200 includes a processor 230 coupled to the transmitting antenna 211 and the receiving antenna 221. The processor 230 is configured to cause the system 200 to (i) emit the transmitted signal including repetitions of a transmitted signal pattern from the transmitting antenna 211, (ii) receive, at one or more receiving antennas 221, a received signal comprising a combination of a plurality of reflections of the transmitted signal, and (iii) for each received signal, process the received signal to determine whether a threshold has been exceeded. When the received signal exceeds the threshold, the processor 230 determines presence due to a motion from a moving body (e.g., a person, etc.). When the received signal does not exceed the threshold, the processor 230 measures a periodicity of the received signal to determine whether the periodicity of the received signal is within a vital range. If the periodicity of the received signal is within the vital range then the processor 230 determines presence due to a vital sign. If the periodicity of the received signal is not within the vital range then the processor 230 determines no presence within the monitored space.

It should be appreciated that the processor 230 may include any suitable architecture (e.g., the processor 230 may include, but is not limited to, a single-processor or multi-processor system of any of a wide array of possible architectures, including field programmable gate array (FPGA), a central processing unit (CPU), application specific integrated circuits (ASIC), digital signal processor (DSP) or graphics processing unit (GPU) hardware arranged homogenously or heterogeneously). It should be appreciated that the processor 230 may receive instructions and/or data from a memory 240, which may include any suitable architecture (e.g., the memory 240 may include, but is not limited to, any of the following: a hard disk, a random access memory (RAM), a read-only memory (ROM), an erasable programmable read-only memory (EPROM or Flash Memory), a static random access memory (SRAM), a portable compact disc read-only memory (CD-ROM), a digital versatile disk (DVD), a memory stick, and any suitable combination of the foregoing).

It should be appreciated that the presence detection system 200 (shown in FIG. 5) and method 600 (shown in FIG. 1) described herein utilize time of flight (ToF) in certain instances. For example, a time of flight from a transmitting antenna 211 located at coordinates $(x_t, y_t, z_t)$ reflected off of an object (e.g., a chair, etc.) located at coordinates $(x_o, y_o, z_o)$ and received by a receiving antenna 221 located at coordinates $(x_r, y_r, z_r)$ may be expressed by the below formula, where c represents the speed of light.

$$\frac{1}{c}\left(\sqrt{(x_t - x_o)^2 + (y_t - y_o)^2 + (z_t - z_o)^2} + \sqrt{(x_r - x_o)^2 + (y_r - y_o)^2 + (z_r - z_o)^2}\right)$$

As shown in FIG. 5, the system 200 may include a signal generator 250 in certain instances. The signal generator 250 may be controlled by the processor 230. The signal generator 250 may be coupled to the transmitter 210 and/or transmitting antenna 211 in certain instances. The signal generator 250 may be an ultra-wide band frequency modulated carrier wave (FMCW) generator. The signal generator 250 may enable the repetitions of a signal pattern to be emitted from the transmitting antenna 211. As described above, the repetitions of the signal pattern transmitted from the transmitting antenna 211 reflect off of the individuals and/or other objects (which may be static in certain instances) in the monitored space, and are received by the receiving antenna 221. It should be appreciated that the transmission of the signal pattern may occur repeatedly (e.g., with a given sweep duration and repetition rate, which may be 2.5 milliseconds, etc.). The received signals are transmitted to the processor 230 to determine whether a threshold has been exceeded and, if not exceeded, whether the periodicity of the received signal is within a vital range.

This periodicity may be provided to the processor 230 by a frequency shifting module 220. For example, the frequency shifting module 220 may receive the received signal received from the receiving antenna 221 (e.g., along with the transmitted signal generated by the signal generator 250). The frequency shifting module 220 may frequency shift (i.e., down convert) the received signal according to the transmitted signal (e.g., by multiplying the signals) and transform the frequency shifted received signal to a frequency domain representation (i.e., via a fast Fourier transforms (FFT)). As mentioned above, if the received signals do not exceed the threshold then the processor 230 may determine with the periodicity of the received signal is within a vital range (described in further detail below).

Figure 2:
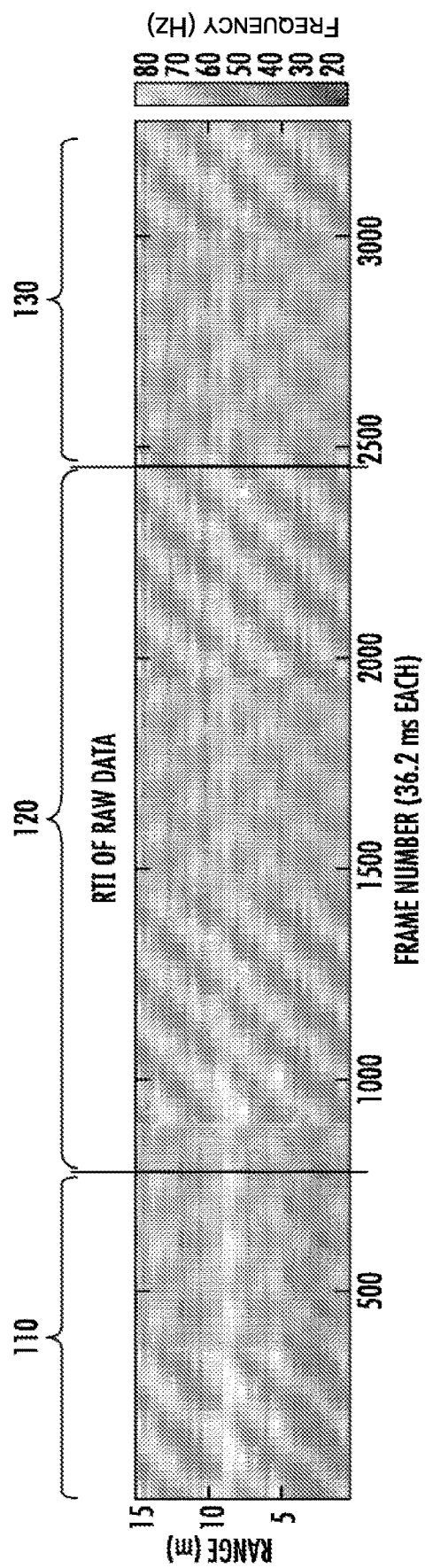
FIG. 2 is a graphical illustration of reflections within different range bins over a time period, the time period including a static period, an active period, and a quasi-static period in accordance with one aspect of the disclosure.

As shown in FIG. 2, the reflections may be separated based on distance from the target (i.e., either the static object or individual in the monitored space). FIG. 2 depicts the reflections in the frequency domain (on the right side y-axis, in Hz), where the x-axis shows time (t) (i.e., in frame number, in milliseconds) and the left side y-axis shows distance (d) (i.e., range, in meters). This time period may be viewed to potentially include a static period 110, an active period 120, and a quasi-static period 130. When the monitored space is empty of individuals the reflections (i.e., the frequency, shown in terms of Hz, of the reflections) may indicate the time period is in a static period 110. When an individual is actively moving, such as walking, in the monitored space then the reflections (i.e., the frequency, shown in terms of Hz, of the reflections) may indicate the time period is in an active period 120. When an individual is present in the monitored space but is stationary, such as sitting and breathing, then the reflections (i.e., the frequency, shown in terms of Hz, of the reflections) may indicate the time period is in a quasi-static period 130. It should be appreciated that the determination of what frequency of reflections indicate a static period 110 may be set during a calibration operation of the detection system 200. In addition it should be appreciated that whether the time period is in a quasi-static period 130 or an active period 120 may be based on whether the threshold is exceeded (e.g., if the threshold is exceeded then the time period may be viewed to be in an active period 120).

Figure 3:
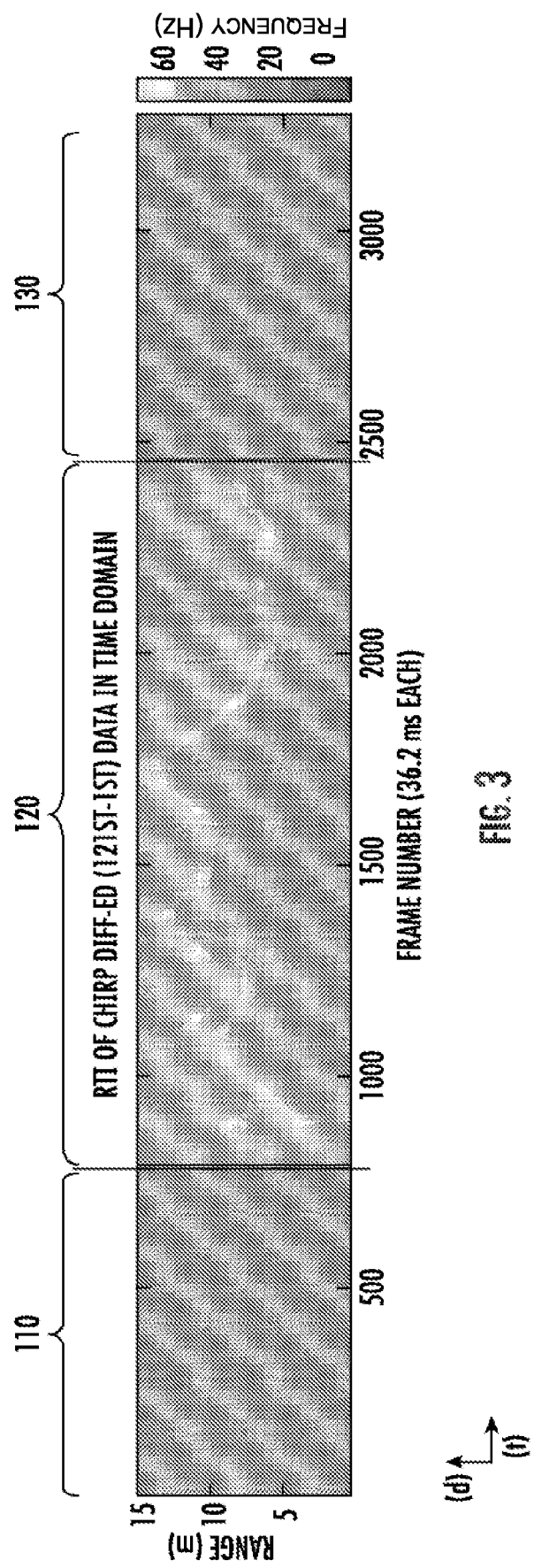
FIG. 3 is a graphical illustration of the reflections from FIG. 2 filtered to remove static objects, the filtered reflections shown over the time period, the time period including a static period, an active period, and a quasi-static period in accordance with one aspect of the disclosure.

The threshold (for which presence due to motion from a moving body is determined) is set based on a variation (i.e. a difference, which may be viewed as a change in energy level at one or more particular frequencies, or equivalently at one or more particular distances) over a time period of the reflections of the transmitted signal in the received signal. For example, if the reflections at each particular frequency (i.e. distance) do not match the reflections for which a static period 110 is determined, then the reflections may indicate there is a variation (e.g., at one or more particular frequency). This variation may be determined through moving target indication (MTI) filtering (i.e., to remove the static objects). FIG. 3 depicts the reflections from FIG. 2 filtered to remove static objects. As shown in FIG. 3, the time period may be viewed to include a static period 110, an active period 120, and a quasi-static period 130. For example, each received reflection may be processed to remove the baseline reflections from the static period 110 (shown in FIG. 3). As shown in FIG. 3, when in the static period 110 there is no variation. Conversely, when in the active period 120 there is a variation (i.e., illustrated as changes in energy levels at one or more particular frequencies over the time period), which is determined by subtracting out (e.g., using MTI filtering) the baseline reflection energy from the static period 110. As shown in FIG. 3, when in the quasi-static period 130 there is only a slight difference in the energy levels at the particular frequencies, which are extremely difficult to perceive. As such, in certain instances, the method 600 and system 200 described herein establish the threshold to be greater than the difference between the reflections during the static period 110 and the quasi-static period 130 so that the variation is easily perceivable. In certain instances this threshold is a multiple of the standard deviation (STD) value learned from the static period. For example, if the change in energy level at a particular frequency is greater than three (3) times of the STD value learned from the static period then the threshold may be exceeded (which may indicate presence due to motion from a moving body). It should be appreciated that the variation may be viewed as a non-averaged value (e.g., a change in energy level at a particular frequency, or equivalently at a particular distance, at a given time period, as described above) or is an averaged value (e.g., viewed as an average change in energy levels across all frequencies, or equivalently from all distances, at a given time period) in certain instances.

Figure 4:
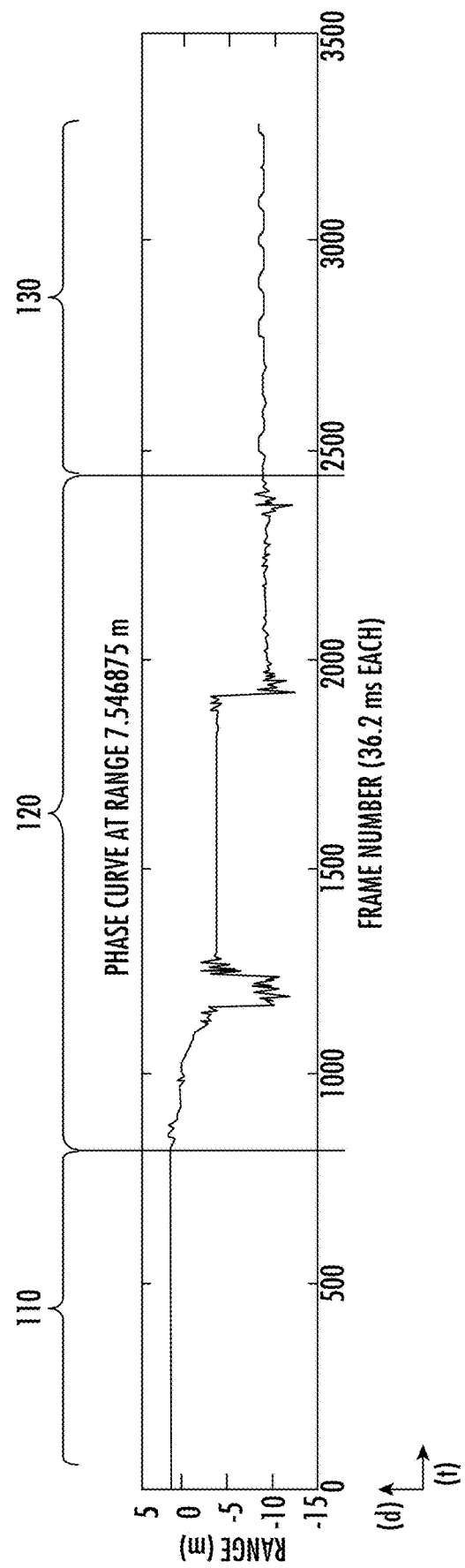
FIG. 4 is a graphical illustration of the reflections from FIG. 2 illustrating the periodicity of the received signal, the periodicity of the shown over the time period, the time period including a static period, an active period, and a quasi-static period in accordance with one aspect of the disclosure.

As illustrated in FIG. 1, when the threshold is not exceeded the periodicity of the received signal is measured to determine whether the periodicity of the received signal is within a vital range (i.e., to determine if there is presence due to a vital sign). FIG. 4 depicts the measured periodicity of the received signal. It should be appreciated that the periodicity may not need to be measured during the active period 120 to determine presence (e.g., if the change in energy levels at particular frequencies is greater than the threshold, for example, a multiple of STD value learned from the static period then presence is determined due to motion from a moving body, and periodicity analysis is not necessary). It is envisioned that periodicity may be useful to determine presence during the quasi-static period 130 (e.g., where an individual is present in the monitored space but is stationary, such as sitting and breathing). It should be appreciated that the determination of presence during the quasi-static period 130 may not rely on a predetermined threshold.

In certain instances, to measure the periodicity of the received signal (which may only be necessary during the quasi-static period 130) a Fourier transform (e.g., an FFT) of the received signal is computed (e.g., by the frequency shifting module 220, as described above) and analyzed (e.g., by the processor 230) to determine whether it is periodic (or aperiodic). It should be appreciated that the signal, due to vitals such as breathing and/or heartbeats of an individual, may include periodic spectral peaks and valleys in the phase that correspond to vital signs. For example, large peaks and valleys may correspond to breathing (i.e., inhalation and exhalation), and smaller peaks and valleys may correspond to heartbeats. It is envisioned that by these peaks and valleys of the periodicity may help determine whether an individual is present (i.e., during the quasi-static period 130) in a monitored space. For example, if the large peaks and valleys (i.e., indicative of breathing) align within a range of respiratory rates then the processor 230 may determine presence within the monitored space. In addition, if the smaller peaks and valleys (i.e., indicative of heartbeats) align within a range of heartbeat rates then the processor 230 may determine presence within the monitored space. In certain instances a typical breathing rate may be between eight (8) to twenty (20) breaths per minute and a typical heartbeat rate may be between forty (40) and two-hundred (200) beats per minute.

As described above, the method 600 and the presence detection system 200 described herein are focused on the detection of presence (which is binary in nature) using a low-cost radar (e.g., frequency modulated continuous wave (FMCW)). The way in which the method 600 and system 200 detect presence is more reliable than existing methodologies. For example, as mentioned above, the methodology used for localization determination may be unable to detect presence during the quasi-static period due to the inability to detect vital signs, and the vital sign detection methodology may be unable to reliably detect presence during quasi-static periods by being reliant on a difficult to establish threshold. It should be appreciated that the presence detection system 200 and method 600 described herein utilize a threshold only for determination of presence during an active period (i.e., not during the quasi-static period, as is done by the existing vital sign detection methodology). As mentioned above, the threshold used to detect presence during the active period may be set between the active period and the static period (e.g., which may mean that the threshold may not be between the static period and the quasi-static period, as is done by the existing vital sign detection methodology). As such, the threshold may be both easier to set and more reliable.

The use of the terms "a" and "and" and "the" and similar referents, in the context of describing the invention, are to be construed to cover both the singular and the plural, unless otherwise indicated herein or cleared contradicted by context. The use of any and all example, or exemplary language (e.g., "such as", "e.g.", "for example", etc.) provided herein is intended merely to better illuminate the invention and does not pose a limitation on the scope of the invention unless otherwise claimed. No language in the specification should be construed as indicating any non-claimed elements as essential to the practice of the invention.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method for detecting presence using a low-cost radar, the method comprising:
   emitting a transmitted signal comprising repetitions of a transmitted signal pattern from a transmitting antenna;
   receiving, at one or more receiving antennas, a received signal comprising a combination of a plurality of reflections of the transmitted signal; and
   for each received signal:
      processing the received signal to determine whether a threshold has been exceeded,
         wherein when the received signal exceeds the threshold, determining presence due to a motion from a moving body, and
         wherein when the received signal does not exceed the threshold, measuring a periodicity of the received signal to determine whether the periodicity of the received signal is within a vital range, and determining the presence due to a vital sign when the periodicity of the received signal is within the vital range.

2. The method of claim 1, wherein the threshold represents a variation over a time period of the reflections of the transmitted signal in the received signal.

3. The method of claim 2, wherein the time period comprises a static period, an active period, and a quasi-static period.

4. The method of claim 3, wherein the threshold is established between the static period and the active period.

5. The method of claim 1, wherein the threshold is greater than a difference between the reflections during the static period and the quasi-static period.

6. The method of claim 3, wherein the measuring of the periodicity of the received signal is completed during the quasi-static period.

7. The method of claim 6, wherein the periodicity is measured by determining a frequency of a plurality of spectral peaks.

8. The method of claim 6, wherein the vital range is within a range of respiratory rates.

9. The method of claim 6, wherein the vital range is within a range of heartbeat rates.

10. The method of claim 1, wherein the low-cost radar is a frequency-modulated continuous wave (FMCW) type radar.

11. A presence detection system utilizing a low-cost radar, the presence detection system comprising:
   one or more transmitting antennas and one or more receiving antennas;
   a transmitter coupled to the one or more transmitting antennas, the transmitter configured to generate a transmit signal comprising repetitions of a transmit signal pattern; and
   a processor coupled to the one or more transmitting antennas and the one or more receiving antennas, the processor configured to cause the presence detection system to:
      emit the transmit signal comprising the repetitions of the transmit signal pattern from the one or more transmitting antennas;
      receive, at the one or more receiving antennas, a received signal comprising a combination of a plurality of reflections of the transmit signal; and
      for each received signal:
         process the received signal to determine whether a threshold has been exceeded,
            wherein when the received signal exceeds the threshold, determine presence due to a motion from a moving body, and
            wherein when the received signal does not exceed the threshold, measure a periodicity of the received signal to determine whether the periodicity of the received signal is within a vital range, and determine the presence due to a vital sign when the periodicity of the received signal is within the vital range.

12. The system of claim 11, wherein the threshold represents a variation over a time period of the reflections of the transmit signal in the received signal.

13. The system of claim 12, wherein the time period comprises a static period, an active period, and a quasi-static period.

14. The system of claim 13, wherein the threshold is established between the static period and the active period.

15. The system of claim 14, wherein the threshold is greater than a difference between the reflections during the static period and the quasi-static period.

16. The system of claim 13, wherein the measuring of the periodicity of the received signal is completed during the quasi-static period.

17. The system of claim 16, wherein the periodicity is measured by determining a frequency of a plurality of spectral peaks.

18. The system of claim 16, wherein the vital range is within a range of respiratory rates.

19. The system of claim 16, wherein the vital range is within a range of heartbeat rates.

20. The system of claim 11, wherein the low-cost radar is a frequency-modulated continuous wave (FMCW) type radar.

* * * * *